No. 612,570. Patented Oct. 18, 1898.
E. F. PICKETT.
VALVE FOR PNEUMATIC TIRES.
(Application filed Aug. 15, 1896.)
(No Model.)
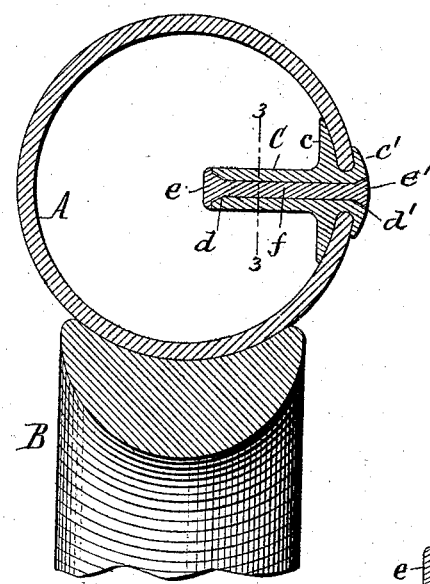
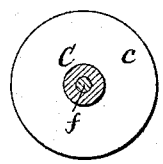
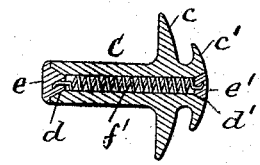
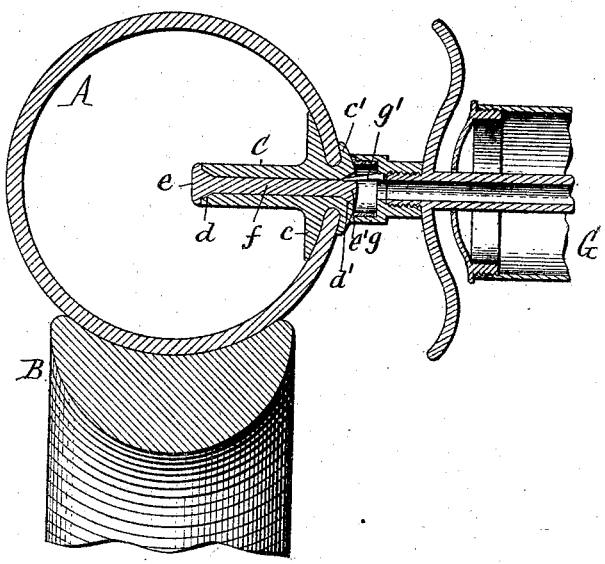
Witnesses:
Theo. L. Popp
Chas. F. Burkhardt
E. F. Pickett, Inventor.
By Wilhelm Bonner
Attorneys.

UNITED STATES PATENT OFFICE.

EDWARD F. PICKETT, OF BUFFALO, NEW YORK.

VALVE FOR PNEUMATIC TIRES.

SPECIFICATION forming part of Letters Patent No. 612,570, dated October 18, 1898.

Application filed August 15, 1896. Serial No. 602,890. (No model.)

*To all whom it may concern:*

Be it known that I, EDWARD F. PICKETT, a citizen of the United States, residing at Buffalo, in the county of Erie and State of New York, have invented a new and useful Improvement in Valves for Pneumatic Tires, of which the following is a specification.

This invention relates to a valve designed more especially for pneumatic tires.

One of the objects of my invention is the production of a reliable valve which comprises a minimum number of parts and which can be manufactured at small cost.

The invention has the further objects to protect the valve from dust, &c., and to so attach the same to the tire that it does not act to retain the latter upon the wheel-rim in the event of the tire being stripped therefrom, thus avoiding injury or destruction of the tire.

In the accompanying drawings, Figure 1 is a longitudinal section of my improved valve applied to a pneumatic tire. Fig. 2 is a similar view showing the manner of forcing air through the valve. Fig. 3 is a cross-section of the valve in line 3 3, Fig. 1. Fig. 4 is a longitudinal section of a modified construction of the valve.

Like letters of reference refer to like parts in the several figures.

A is a pneumatic tire of any suitable construction, and B a wheel-rim to which the tire is applied.

C is the outer tube or casing of my improved valve, which is preferably arranged within the hollow tire and attached at its outer end solely to the tire, so as to be entirely independent of the rim. This internal valve-case is preferably attached to one side of the tire, as shown in the drawings, and is provided on its outer portion with attaching flanges or collars $c$ $c'$, which are secured to the inner and outer surfaces of the tire by cement or other suitable means, the tire having an opening for the passage of the valve-case. This valve-case extends from its attached end inwardly into the chamber of the tire and is thus inclosed by the tire and protected from dust, &c. The attaching end of the casing is substantially flush with the outer surface of the tire, and the valve is therefore not exposed to injury, as are the external valves in general use.

Hitherto the valve has been passed through an opening in the wheel-rim and in some cases fastened to the rim as well as the tire. In case the tire is stripped from the rim the valve, owing to its arrangement in the rim, restrains or prevents the detachment of the tire at this point, causing the tire to be torn from the valve and usually producing so large a rent therein as to render it unserviceable. By supporting the valve entirely separate from the wheel-rim in the manner above described the valve and tire always remain intact and all danger of tearing the valve out of the tire is obviated.

$d$ $d'$ represent valve-seats, preferably of conical form, arranged at opposite ends of the valve-case C, and $e$ $e'$ are correspondingly-shaped valves applied to said seats. The inner valve $e$ is arranged to open inwardly and the outer valve $e'$ outwardly, and the two valves are connected by an elastic valve stem or connection $f$, extending loosely through the bore of the valve-case. The valves and the elastic connection $f$ are preferably formed of a single piece of soft rubber. The elastic valve-stem $f$ is stretched or distended in the closed position of the valves, so that the stem tends constantly to draw both valves toward each other and close the same against their seats. For this purpose the valve-stem in its contracted or unstretched condition is somewhat shorter than the distance between the inner ends of the valve-seats $d$ $d'$. The stem and valves are introduced into the valve-case by compressing the same sufficiently to enter the case. This may be done by means of a pair of pliers such as are commonly used for introducing a plug into a punctured tire.

In inflating the tire the outer valve $d'$ is compressed on one side or separated from its valve-seat to form an inlet-passage for the air. To facilitate this operation, the nozzle of the air-pump G may be provided with a cup $g$, which is placed over the inlet end of the valve-case and which has a forwardly-projecting pin $g'$, which is inserted between the outer valve and its seat, as shown in Fig. 2. The air entering the valve-case passes between the latter and the valve-stem $f$, forces the inner valve *e* from its seat, and enters the tire, the elasticity of the stem permitting the air to unseat said valve. During the return stroke of the pump-piston the inner valve is closed by the air-pressure within the tire assisted by the reaction of the distended valve-stem. Upon withdrawing the pin *g'* the outer valve *e'* expands and closes the adjacent end of the case, thus forming a reliable air-seal at both ends of the valve.

The tire may be deflected by passing a pin of sufficient length between the case and the valve-stem and pushing the inner valve from its seat.

The case C, like the valves *e e'* and their connecting-stem, is preferably made of soft rubber, and its attaching-flanges *c c'* are formed integrally therewith. By this construction the valve comprises but two parts and can be produced at correspondingly small cost. The valve is, moreover, wholly free from screw-threads or similar joints through which air is liable to leak.

The flexible construction of the entire valve is also advantageous in connection with its internal arrangement, as it permits the valve to yield in case the tread of the tire should bear against the same by reason of a partial deflation of the tire, thus guarding against breakage of the valve.

It is obvious that the internal arrangement of the valve is applicable to any tire-valve, irrespective of its particular construction or the material of which it is made, and also that the construction of the valve herein shown and described is applicable to an outside as well as an inside valve.

If desired, a spiral spring *f'* may be used as the elastic connection between the two valves *e e'* in place of the rubber valve-stem, as shown in Fig. 4.

I claim as my invention—

1. The combination with a continuous valve tube or casing having a continuous bore extending from end to end and having at both ends of said bore valve-seats which face in opposite directions, of valves arranged against the outer sides of said seats and each capable of moving toward and from its seat, and an elastic connecting-stem arranged in said bore and holding both valves against their seats while permitting each valve to rise independently from its seat, substantially as set forth.

2. The combination with a pneumatic tire, of a continuous flexible valve tube or casing secured at its outer end to the tire and projecting into the latter and having a continuous bore extending from end to end and having at both ends of said bore valve-seats which face in opposite directions, valves arranged against the outer sides of said seats and each capable of moving toward and from its seat, and an elastic connecting-stem arranged in said bore and holding both valves against their seats while permitting each valve to rise independently from its seat, substantially as set forth.

3. The combination with a pneumatic tire, of a rubber valve-case arranged within the tire and provided at its outer end with integral rubber flanges attached to opposite sides of the tire, substantially as set forth.

Witness my hand this 29th day of July, 1896.

EDWARD F. PICKETT.

Witnesses:
CARL F. GEYER,
ELLA R. DEAN.